United States Patent [19]
Manesh

[11] Patent Number: 5,812,251
[45] Date of Patent: Sep. 22, 1998

[54] ELECTRO-OPTIC STRAIN GAGES AND TRANSDUCER

[76] Inventor: Ali Manesh, P.O. Box 1831, Fayetteville, Ark. 72702

[21] Appl. No.: 270,683

[22] Filed: Jun. 13, 1994

[51] Int. Cl.[6] .................................................. G01B 11/16
[52] U.S. Cl. ............................................... 356/32; 73/800
[58] Field of Search ............................ 356/32, 373, 400; 73/800, 862.624

[56] References Cited

U.S. PATENT DOCUMENTS

| | | | |
|---|---|---|---|
| 4,071,753 | 1/1978 | Fulenwider et al. | 356/32 |
| 4,611,378 | 9/1986 | Caserta et al. | 356/32 |
| 4,674,900 | 6/1987 | Erzsebet et al. | 250/227.14 |

*Primary Examiner*—Richard A. Rosenberger
*Attorney, Agent, or Firm*—Daniel R. Alexander; Head, Johnson & Kachigian

[57] ABSTRACT

The present invention is disclosed comprising a light source, photo detector and a lens system as its main parts. The effect of light intensity on changing current through the photo detector due to the linear or angular displacement of the detector with respect to the light source is the focusing point of this idea. The basic unit of this invention consists of a light source and a detector aiming at each other with a set of lens in between and all are pre-assembled on a film of polymer. The assembly then can be glued on the surface of any test specimen to measure any possible strain. As an alternative, two heads of fiber optic cables can be preassembled on the mounting polymer pointing toward each other. In this method, optical fibers are used to carry the light and the light source and detectors can be isolated from any ambient electro magnetic noise and away from the testing equipment. Lenses are utilized to either converge or to columnate the light rays.

20 Claims, 7 Drawing Sheets

Front View
FIG. 6A

Top View
FIG. 6B

Front View
FIG. 8A

Top View
FIG. 8B

FIG. 15C Bending Load (Tensile Stress)

FIG. 15D Bending Load (Compression Stress)

ELECTRO-OPTIC STRAIN GAGES AND TRANSDUCER

BACKGROUND OF THE INVENTION

The present invention relates to a method and apparatus for detecting and measuring strain on a structural surface. The present invention incorporates a simple, low cost light source, detector and lens system pre-assembled on a mounting pad to measure the strain on the surface of any structure. This technique provides a simple inexpensive solution to many problems in using conventional strain gages. The lens system (in the form of cylindrical lenses) and the mounting pad can be manufactured by various techniques such as extrusion. This invention provides a means to isolate the electronic components of the electro-optic sensing system from electro magnetic noises. A basic unit consists of a light source, a light detector, a set of lenses, mounting pad, and electronic or optical conductors.

DESCRIPTION OF THE PRIOR ART

Stress in a material can be calculated from a measurable strain along with other material properties. There are methods of measuring strain or deformation based on various techniques such as mechanical, optical, acoustical, pneumatic, and electrical phenomena.

MECHANICAL method of measuring strain is the earliest one that employ a system of levers to amplify the minute strain to a level that can be read. Extensometer is an example of this type.

OPTICAL method which usually uses the interference fringes produced by optical flats to measure strain is very difficult for field application.

ELECTRICAL devices are dependent upon electrical characteristics of the sensor. Capacitance and inductance strain gages are sensitive to vibration Piezoelectric strain gage is not suitable for measuring static strains. By far the most widely used strain gage is the bounded resistance gage which still is affected by electro magnetic field.

ELECTRO OPTICAL devices use the combination of electrical and optical signals to measure the strain.

SUMMARY OF THE PRESENT INVENTION

The present invention relates to a method and apparatus for detecting and measuring strain on a structural surface. More particularly, the present invention relates to the effect of change in light intensity on the current through light detectors. Light detectors, proportional to the light intensity, allow more electrical current to pass through them. Change in the current can be communicated to a display device or a control unit. A simple electronic circuit can provide output signals for communication. The basic unit consists of a light detector (photo-transistor) and a light source aiming at the detector, and one or several lenses in between them. The detector converts the incident light power into an electrical signal.

DRAWING SUMMARY

Referring particularly to the drawings for the purpose of illustration only, there is illustrated.

DESCRIPTION OF THE PREFERRED EMBODIMENTS

Figure 16A:
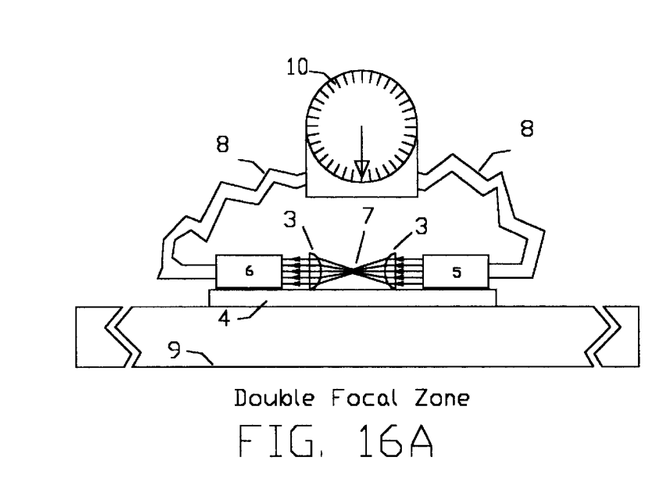
FIG. 16 is sketches of different assemblies of Electro Optic Strain Gage.
Figure 16B:
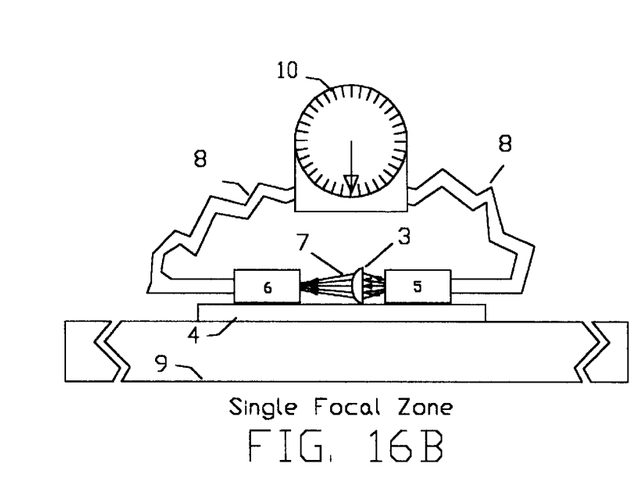
Figure 16C:
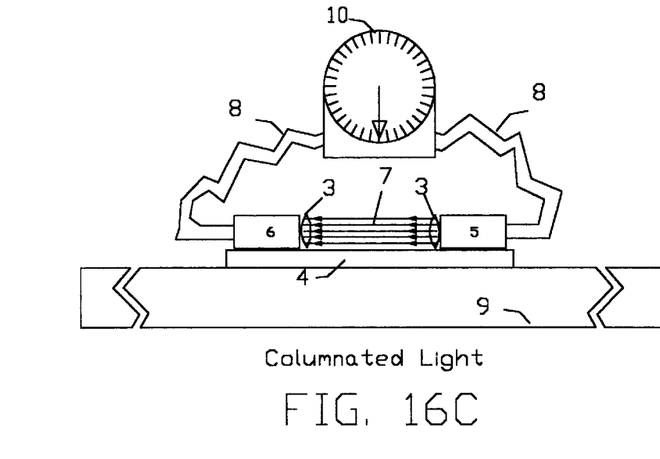
Figure 16D:
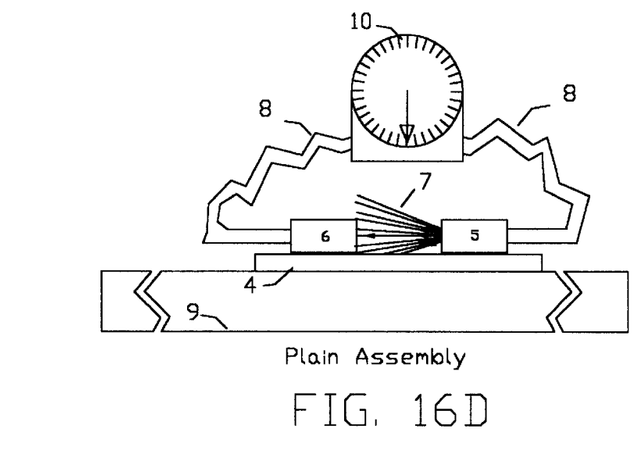
Figure 17:
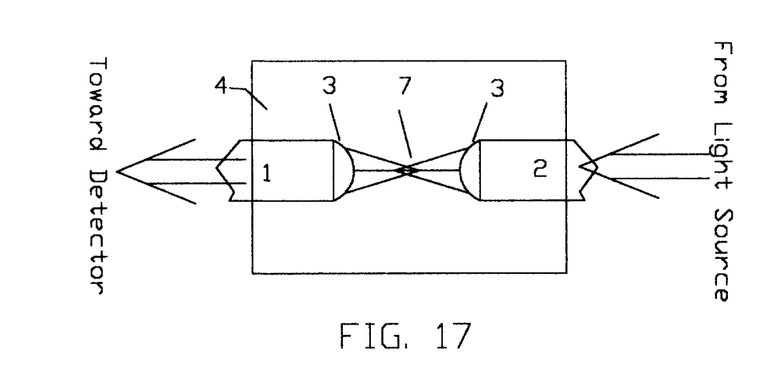
FIG. 17 presents an assembly of a basic unit for basic application.

The light rays, when they leave the source into any other media, usually are scattered in a spatial radiation pattern in a three dimensional space. A two dimensional section of a typical spatial pattern is shown in FIG. 16D. The intensity of light at any given point depends on its distance from the light source in x and y direction. Therefore, any change in the detector's position relative to the light source changes the available light intensity for the detector. Further more, detectors have their own angular responses. An angular response is presented in the FIGS. 13D, 14D, 15C, and 15D. Due to the angular response, any change in the angular orientation of the detector with respect to the light source, changes the available light intensity for the detector.

The lens systems are being used for various applications such as light convergence and columnation. Typically one or more lens can be used with this invention for the purpose of converging the light or columnating the light. In the columnated light systems, the light intensity will change when the relative position of light source, detector, and the lens system change. The convergent systems are designed to have coincident focal zone. In these systems, the light intensity changes when the relative position between lenses changes and displaces the focal zone for one or all the lenses. Gages with convergent light system are more sensitive and should be used for small strain applications. FIGS. 1–14 and 17–20 present the conceptual schematics for columnated and convergent light beam system.

Since the basic idea is to measure the light intensity, there are no reasons to have light source and/or detector (electronic components) assembled on the mounting pad to be used on the surface of the test part to measure the strain. An alternative is to mount the electronic components away from test site and use fiber optics to transfer light. On the test part, fiber optic heads can be mounted (pointing toward each other) directly or via a lens system or other optical connectors (FIGS. 2, 4, 6, 8, 10, 12 and 13).

Figure 1:
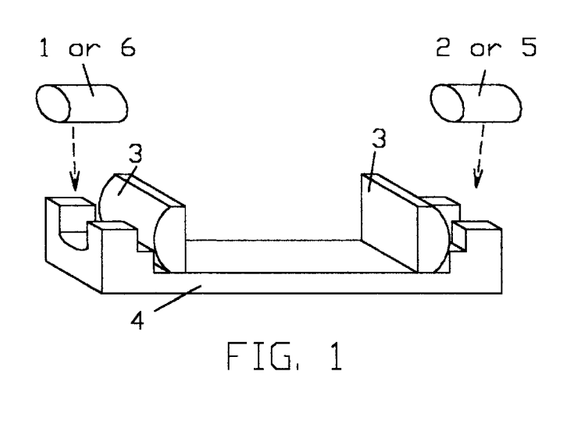
FIG. 1 presents the basic components of a unit with two lens sets to converge light beams.
Figure 2A:
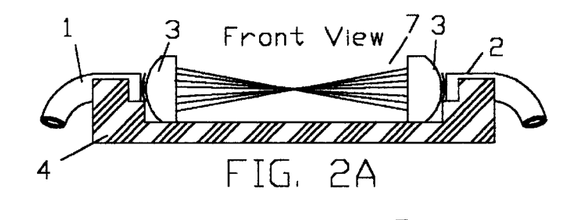
FIG. 2 is a preassembled basic unit.
Figure 2B:
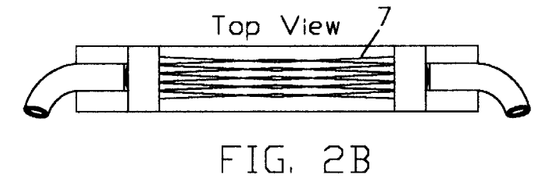
Figure 3:
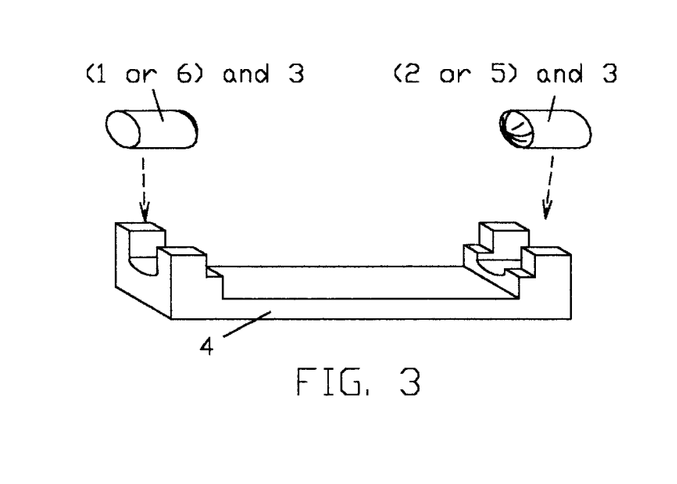
FIG. 3 presents basic components when the lens is pre assembled on the light source and detector.
Figure 4A:
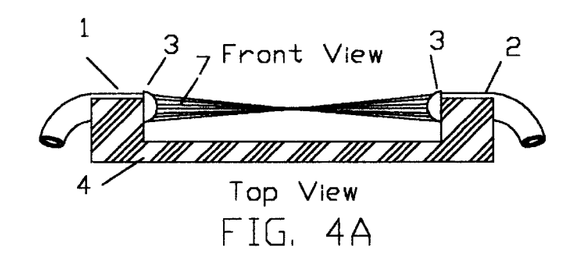
FIG. 4 is a sketch of how the components in figure three are assembled and used.
Figure 4B:
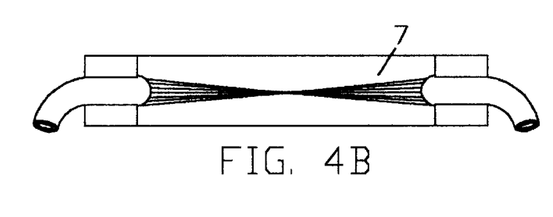
Figure 5:
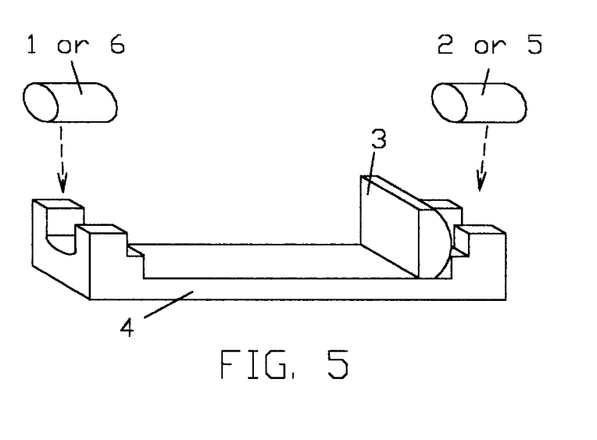
FIG. 5 presents the basic unit with one lens set to converge the light on the detector's plate.
Figure 6A:
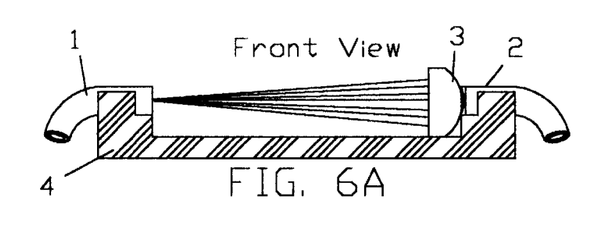
FIG. 6 is application of an assembly with one lens set.
Figure 6B:
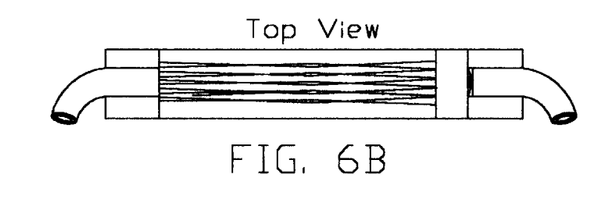
Figure 7:
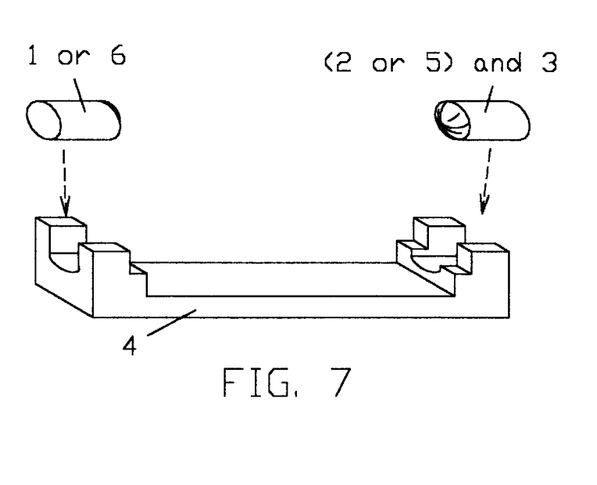
FIG. 7 presents the possibility of using a light source preassembled with lens set.
Figure 8A:
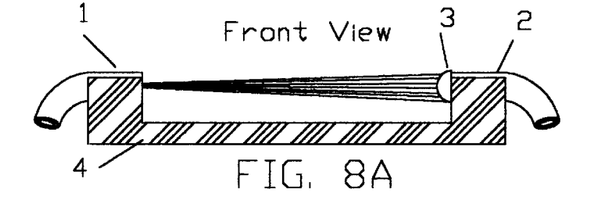
FIG. 8 presents application of parts shown in the FIG. 7.
Figure 8B:
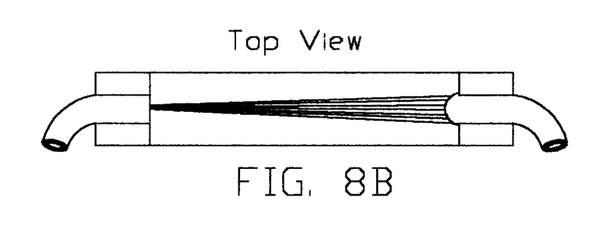
Figure 9:
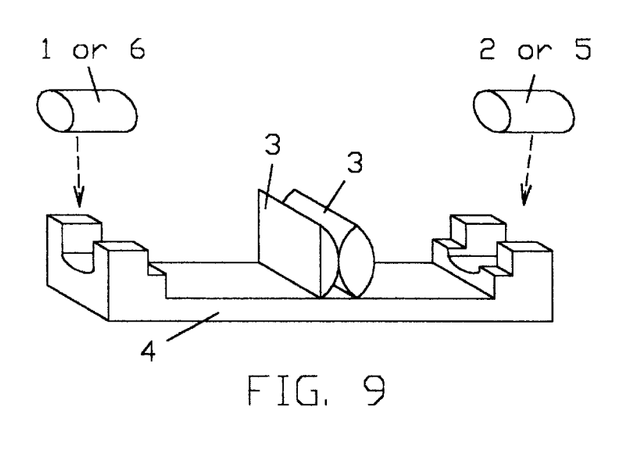
FIG. 9 presents a lens stack to columnate the light beams while the lens system is away from light source and detector.
Figure 10A:
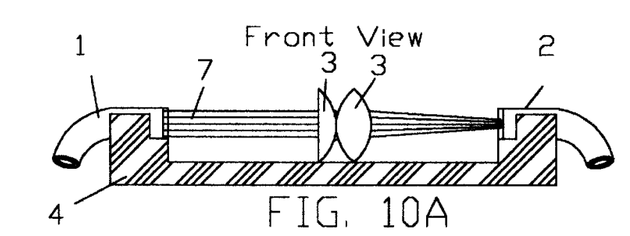
FIG. 10 is a simplified application of columnated light.
Figure 10B:
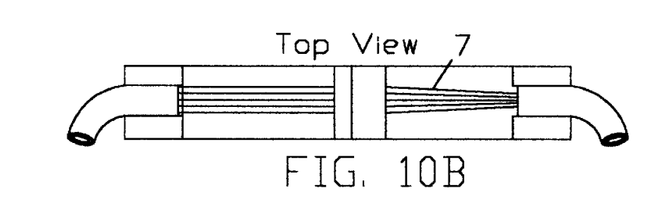
Figure 11:
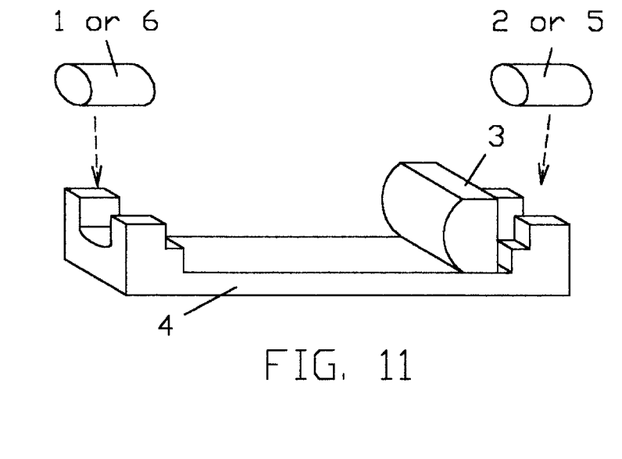
FIG. 11 is an application of lens for columnation while lens system is close to the light source.
Figure 12A:
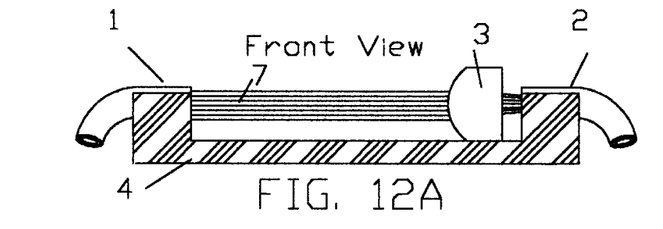
FIG. 12 is a typical assembly of parts presented in the FIG. 11.
Figure 12B:
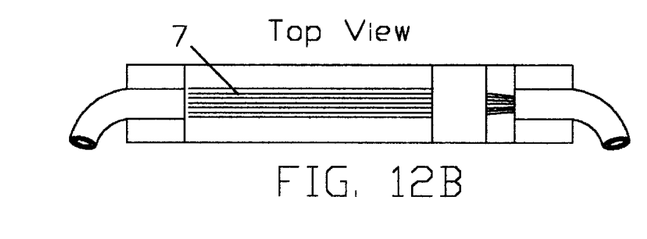
Figure 13A:
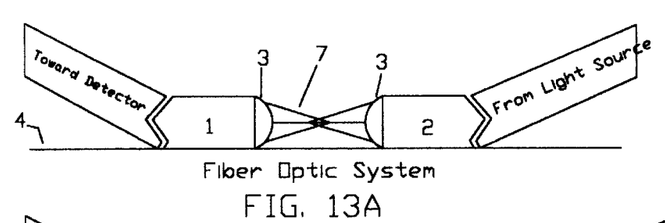
FIG. 13 is the effect of axial and bending forces on the gage when the electronic parts (light source and detector) are not in the action site and light has been conducted through fiber optics.
Figure 13B:
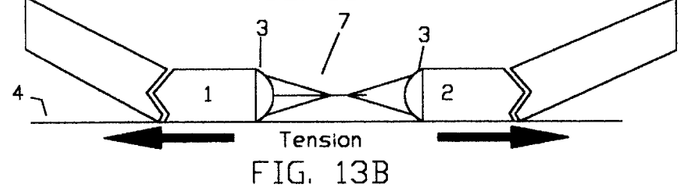
Figure 13C:
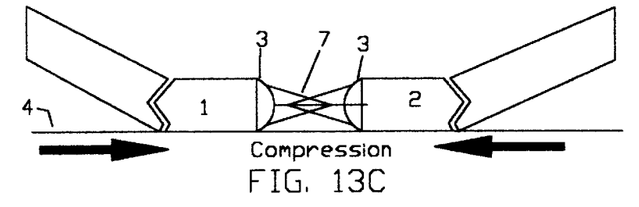
Figure 13D:
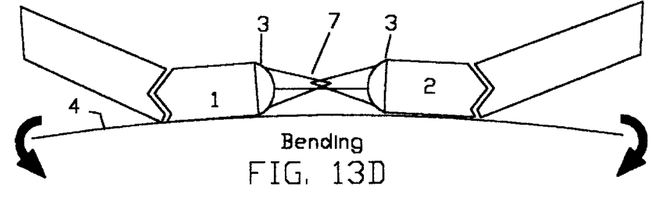
Figure 14A:
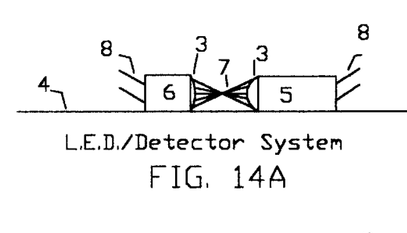
FIG. 14 is the effect of forces on the gage when the electronics parts are in the action site.
Figure 14B:
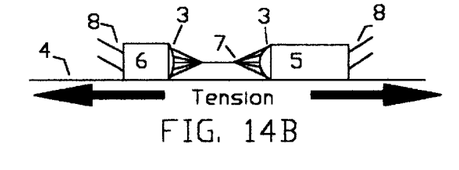
Figure 14C:
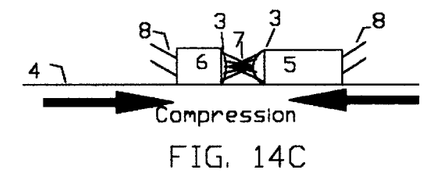
Figure 14D:
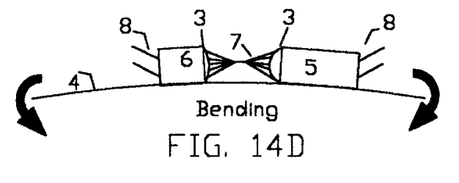

A typical unit consists of a light detector (6), a light source (5), Lens system(s) (3), and a mounting plate (4), (4, FIGS. 1, 3, 5, 7, 9, 11 and 14). The light source (5) can be any type with any wave length. The detector (6) must have its maximum sensitivity for the wavelength emitted by selected light source (5) to form a pair. The lens system (3) can be manufactured separately and assembled on the mounting plate (4) or can be manufactured on the mounting plate (4). Its always possible to use special optical conductors (2) and (1) to bring the light from source (5) and take the light to the detector (6). The mounting plate (4) is a relatively soft material which can be glued on a surface (9) and elongate with it. The maximum elongation of the mounting plate (4) will be on its middle section which has the least thickness. The lens system (3) is used to gain the maximum intensity or the light by converging the light beam (7) of columnate it. In addition to use external lens systems (FIGS 1 and 2), it is possible to manufacture the lens systems as part of the light source (5) and detector (6) as well as light conductor (2) from the source and light conductor (1) toward the detector (FIGS 3 and 4). The basic unit can be manufactured by installing the lens systems (3) equal distance away from the light source (2 or 5) and detector (1 or 6), FIG. 15. It is also possible to have only one lens system (3) in front of the light source (2 or 5) to create light beams (7) which are columnated or converged (FIGS. 5–8, 11 and 12).

Figures 15A, 15B:
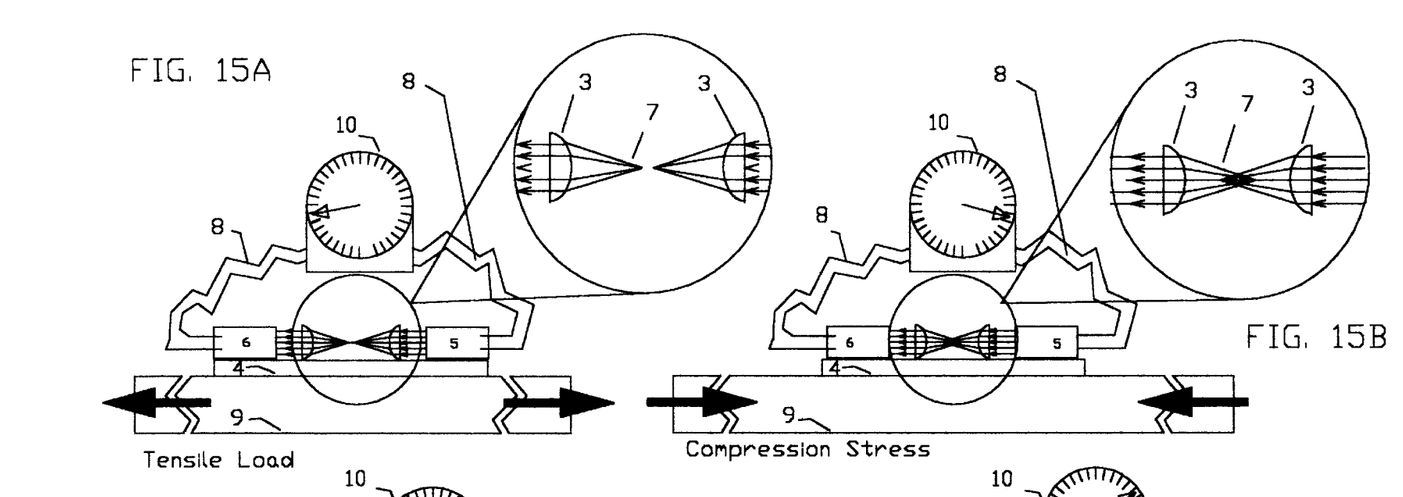
FIG. 15 presents systems equipped with meters under various loading situations.
Figure 15C:
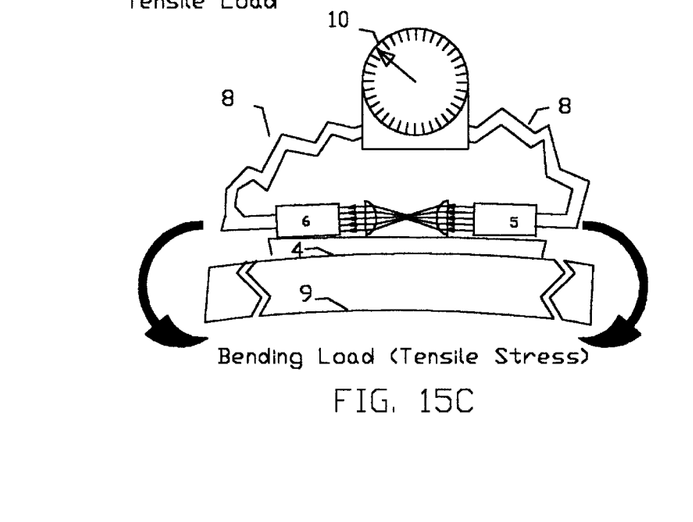
Figure 15D:
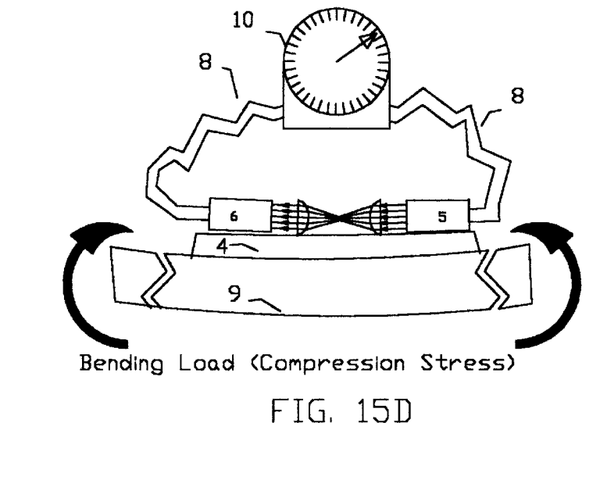

Basic application of the gage are presented in the FIGS. 13 and 14. With this system, we can separate the electronic components (light source (5) and detector (6)) from optical components (lens system (3), mounting plate (4) and light conductors (1) and (2, FIG. 13)). When light passes through the lens system, the beams (7) converges to a focal zone which is coincide with another focal zone of another lens system (3) in front of the detector. The converged light on the focal zone will hit the detector lens system (3) and will be columnate before it goes to detector for maximum gain. Application of any load which can create strain, change the distance between the light source (5) and the detector (6) which in terms move the focal zone away from the coincident point which in terms will change the current through the detector. A meter (10) can be used to monitor the changes (FIG. 15).

Figure 18:
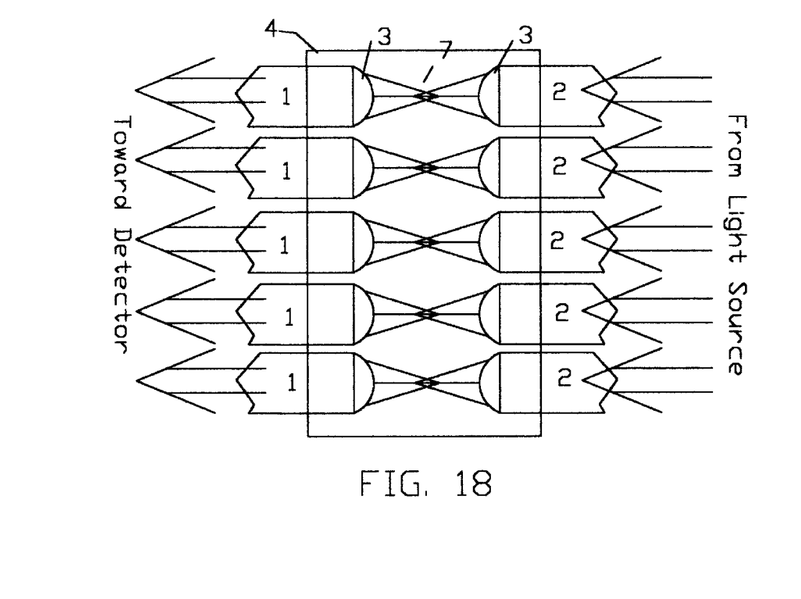
FIG. 18 is an assembly of units which have multi light sources and multi detector for more sensitivity and special applications.
Figure 19:
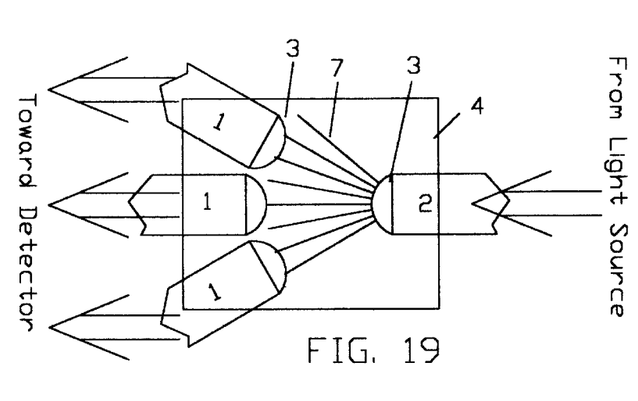
FIG. 19 is special gage assembly with one light source and multi detectors.
Figure 20:
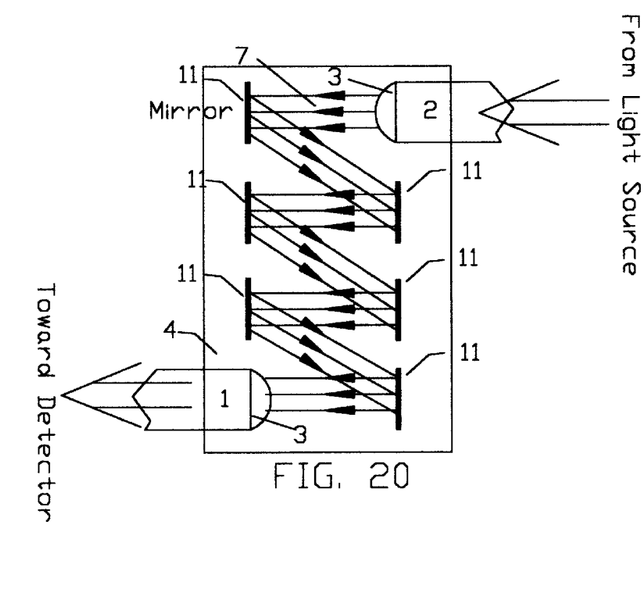
FIG. 20 presents the possibility of using optical reflectors or retractors to increase the travel length and therefore sensitivity.

For special application, the system can be used with various combinations of light sources and detectors (FIGS. 18 and 19). For the maximum sensitivity it is possible to use several basic units mounted on one mounting plate to form a rectangular array to multiplex the effect of strain (FIG. 18). It is also possible to use several detector in a form of a circular array with a single light source on the center (FIG. 19). Another possible configuration is to use the optical refractor or reflectors to increase the travel length for the light beam (FIG. 20).

As described above, the foregoing description represents only the presently preferred embodiment of the invention. Various modifications and additions may be made to the invention without departing from the spirit of scope of the invention, which is intended to be limited only by the scope of the appended claims.

What is claimed is:

1. An electro optical strain gauge unit comprising at least one light source for emitting light, at least one light detector for receiving emitted light, a lens system of at least one lens for at least one of columnating and converging the light emitted by the light source or received by the light detector, and a deformable mounting pad having a planar surface adapted to be attached to a material for strain measurement and a recessed surface upon which the light source, light detector and lens system are mounted so that the light detector provides a signal proportional to the intensity of light received from the light source and passed through the lens system.

2. The unit as recited in claim 1 wherein said lens system comprises at least one lens separate from the light source and light detector.

3. The unit as recited in claim 2 wherein said lens system comprises two lenses for converging the light to a common focal point.

4. The unit as recited in claim 2 wherein said lens system comprises at least one lens for converging the light emitted by said light source.

5. The unit as recited in claim 2 wherein said lens system comprises at least one lens for columnating the light from said light source.

6. The unit as recited in claim 1 wherein said lens system comprises at least one lens forming part of at least one of said light source and said light detector.

7. The unit as recited in claim 6 wherein said lens system comprises two lenses for converging the light to a common focal point.

8. The unit as recited in claim 6 wherein said lens system comprises at least one lens for converging the light emitted by said light source.

9. The unit as recited in claim 6 wherein said lens system comprises at least one lens for columnating the light from said light source.

10. An electro optical strain gauge unit comprising at least one first optical conductor for transmitting light from a light source, at least one second optical conductor for transmitting light to a light detector, a lens system of at least one lens for at least one of columnating and converging the light emitted by said first optical conductor or received by said second optical conductor, and a deformable, mounting pad having a planar surface adapted to be attached to a material for strain measurement and a recessed surface upon which the first and second optical conductors and lens system are mounted so that the second optical conductor receives light emitted by said first optical conductor and passed through said lens system.

11. The unit as recited in claim 10 wherein said lens system comprises at least one lens separate from the first and second optical conductors.

12. The unit as recited in claim 11 wherein said lens system comprises two lenses for converging the light to a common focal point.

13. The unit as recited in claim 11 wherein said lens system comprises at least one lens for converging the light emitted by said first optical conductor.

14. The unit as recited in claim 11 wherein said lens system comprises at least one lens for columnating the light from said first optical conductor.

15. The unit as recited in claim 10 wherein said lens system comprises at least one lens forming part of at least one of said first and second optical conductors.

16. The unit as recited in claim 15 wherein said lens system comprises two lenses for converging the light to a common focal point.

17. The unit as recited in claim 15 wherein said lens system comprises at least one lens for converging the light emitted by said first optical conductor.

18. The unit as recited in claim 15 wherein said lens system comprises at least one lens for columnating the light from said first optical conductor.

19. The unit as recited in claim 10 comprising a plurality of at least one of said first and second optical conductors.

20. The unit as recited in claim 10 wherein said lens system includes at least one refractor or reflector.

* * * * *